United States Patent [19]

Davies

[11] 3,890,424

[45] June 17, 1975

[54] METHODS OF TREATING SOLID SUBSTANCES WITH A VAPOR

[75] Inventor: Timothy Alan Davies, Weymouth, England

[73] Assignee: United Kingdom Atomic Energy Authority, London, England

[22] Filed: Nov. 8, 1971

[21] Appl. No.: 196,761

[30] Foreign Application Priority Data
Nov. 20, 1970  United Kingdom............... 55422/70

[52] U.S. Cl. ......................... 423/19; 34/15; 34/92; 264/0.5; 423/261
[51] Int. Cl............................................ C01g 43/02
[58] Field of Search......... 423/261, 19; 252/301.1 R; 264/0.5; 75/222; 34/15, 92

[56] References Cited
UNITED STATES PATENTS

| | | |
|---|---|---|
| 3,161,701 | 12/1964 | Johnson et al.......................... 264/.5 |
| 3,230,279 | 1/1966 | Littlechild............................. 264/.5 |
| 3,301,640 | 1/1967 | Turbett.............................. 423/261 |
| 3,320,179 | 5/1967 | Gens..................................... 264/.5 |
| 3,361,857 | 1/1968 | Rose..................................... 264/.5 |
| 3,468,985 | 9/1969 | Bildstein et al....................... 264/.5 |

OTHER PUBLICATIONS

Perry, J. H.; Chemical Engineers' Handbook, N.Y., McGraw-Hill, 1950, p. 293.

*Primary Examiner*—Benjamin R. Padgett
*Assistant Examiner*—E. A. Miller
*Attorney, Agent, or Firm*—Larson, Taylor and Hinds

[57] ABSTRACT

Liquid is vaporized under reduced pressure, and the vapors are swept over solid material, especially nuclear fuel containing bodies, containing unwanted solid evaporable substances in a heated furnace. The vapor helps sweep out vaporized unwanted solid substances and also excludes other unwanted gases.

5 Claims, No Drawings

METHODS OF TREATING SOLID SUBSTANCES WITH A VAPOR

BACKGROUND OF THE INVENTION

This invention relates to methods of removing unwanted substances from a material.

The present invention and finds advantageous application in the removal of unwanted binder substance from nuclear fuel particles which particles may be agglomerates of small size used to form kernels of fission product retaining fuel.

SUMMARY OF THE INVENTION

In its broad aspect therefore the invention resides in a method of treating material with gas or a vapour at a temperature above ambient temperature in which the material is placed in a furnace the interior of which communicates with a volume of liquid containing the gas or vapour in a liquid phase, heating the material and simultaneously reducing the pressure in the furnace to promote boiling of the liquid phase whereby the gas or vapour contacts the material.

The present invention provides a convenient method of achieving contact between the vapour and the material, the vapour being generated in a closed furnace to the exclusion of other, unwanted, gases. In the present invention the furnace, being subject to evacuation, communicates only with the vessel of liquid and the evacuation means so that the evaporated unwanted substances are removed from the furnace.

As stated above the invention has proved effective as a method of treating particulate nuclear fuel material in order to carry out a controlled vapour treatment. One example is in the production of porosity or voidage in small sized agglomerates of nuclear fuel grains admixed with a carbonisable binder.

Accordingly in this aspect a method removing unwanted evaporable substances from nuclear fuel resides in placing the fuel in a furnace, the interior of which communicates with a volume of water and with a source of suction, heating the furnace whilst evacuating it so as to generate steam and drawing the steam over the fuel in the furnace to evaporate the unwanted substance and to render the fuel porous.

The process may be applied to a method of effecting removal of unwanted substances from a small agglomerate of urania powder grains, by evaporation. In the production of fission product retaining fuel particles such small agglomerates of urania are made to form kernels, later to be coated with fission product retentive layers. It is advantageous to make these kernels porous so that they can individually retain fission products which may be formed during operation of the fuel. With the object of producing porosity, it has already been suggested that fugitive materials be incorporated in the kernels which are later removed. To this end, grains of carbon may be mixed with urania grains before forming them into a small kernel. Alternatively the urania grains may be coated with a fugitive substance such as stearic acid. In either case, in accordance with the present invention, a batch of these kernels are placed in an electrically heated, cylindrical muffle furnace supported with its longitudinal axis horizontal. The furnace charge thus lies between two apertures constituted by the open ends of the cylindrical furnace.

One of these apertures is connected to furnace evacuation means such as a vacuum pump whilst the other aperture is connected to a space above water level in an otherwise closed container which contains water.

In the case where carbon was employed as the fugitive substance, the furnace was brought up to 250°C whilst the vacuum pump was operated to evacuate the muffle furnace, and the water container, until the water boiled.

Steam from the water passed without condensing from the water container, into the muffle furnace and over the charge. The carbon was evaporated and passed out of the furnace with the continuing flow of steam, to exhaust.

The process was continued until the required porosity in the kernels by the evaporation of carbon had been obtained.

DESCRIPTION OF THE PREFERRED EMBODIMENT

EXAMPLE I

A quantity of $UO_2$ powder mixed with 12 percent wt stearic acid binder was formed into spheroids by the known powder agglomeration method having 800 $\mu$m diameters. They were heated in air at 150°C to cause some of the binder to evaporate. Any or most of the residual binder was converted to a carbide. The spheroids were then placed in a silicon crucible and placed in a muffle furnace and heated therein to 800°C. The muffle furnace was cylindrical with its axis horixontal and open at both ends. One of the open ends was connected by a short duct to a vessel, otherwise closed, containing water. The other end was connected to furnace evacuation means. As the furnace and the vessel were evacuated so the water boiled and water vapour was drawn over the spheroids in the crucible. This process was continued for two hours, the temperature of the furnace being maintained at about 800°C. The furnace was then allowed to cool whilst still under evacuation, and when cool the crucible was removed. The spheroids were examined and found to contain $UO_2$ and less than 100 ppm carbon. Physically examination showed that the spheroids had a porosity of 40 percent.

The spheroids were then sintered in a reducing atmoshpnere and their porosity reduced to 25 percent ie to the degree of porosity required for nuclear fuel kernels. After sintering the spheroids were coated with fission product retaining layers in known manner and incorporated in nuclear fuel elements.

EXAMPLE II

Seed particles 350 m$\mu$ in diameter of carbon were used as starting seeds in a slow growth agglomeration process in which a powder consisting of $UO_2$ grains coated with stearic acid was agglomerated on to the seeds to form particles of about 800 m$\mu$ diameter. The green particles were heated in air at about 150°C to evaporate the binder and carbonise any residue. The particles were then placed in a muffle furnace as before and heated to 800°C whilst the furnace and an adjoining vessel containing water were subject to evacuation. The water boiled and water vapour passed over the particles as in Example 1. After heating under these conditions for four hours the particles were removed and microsectioning of representative samples showed that the carbon seed had been removed leaving a central void surrounded by a porous shell.

The particles were then sintered without difficulty or fracture under conditions normal to the preparation of kernels for fission product retaining coated particle fuel.

In both Examples I and II the preheat treatment in air at 150°C may be omitted if desired.

We claim:

1. A method of removing unwanted evaporable solid substances from a solid material, comprising placing said solid material in a closed furnace having a pair of oppositely-disposed openings so that said material is between said openings, connecting one of said openings with a vessel containing liquid, operating the furnace so as to heat the material and continuously evacuating the furnace by way of the other of said openings in order to reduce pressure in said liquid containing vessel to promote boiling of the liquid in said vessel whereby vapor generated by boiling is drawn over the material in said furnace so as to facilitate evaporation of said unwanted substances from said material, the evaporated material being removed through said other opening.

2. The method of claim 1 wherein said liquid is water.

3. The method of claim 1 wherein said liquid is water, said solid material comprises nuclear fuel-containing bodies and said unwanted substances comprise evaporable seeds on which said nuclear fuel has been agglomerated.

4. A method of removing unwanted carbon from uranium dioxide-containing bodies incorporating the unwanted carbon, comprising placing said bodies in a closed furnace having a pair of oppositely-disposed openings so that said bodies are between said openings, connecting one of said openings with a vessel containing water, operating the furnace so as to heat the bodies and continuously evacuating the furnace by way of the other of said openings in order to reduce pressure in said liquid containing vessel to promote boiling of the water whereby water vapor generated by said boiling is drawn over the bodies in said furnace so as to facilitate evaporation of the unwanted carbon from said material, the evaporated material being removed through said other opening.

5. A method of removing unwanted stearic acid binder from uranium dioxide-containing bodies incorporating the unwanted binder, comprising placing said bodies in a closed furnace having a pair of oppositely-disposed openings so that said bodies are between said openings, connecting one of said openings with a vessel containing water, operating the furnace so as to heat the bodies and continuously evacuating the furnace by way of the other of said openings in order to reduce pressure in said liquid containing vessel to promote boiling of the water whereby water vapor generated by said boiling is drawn over the bodies in said furnace so as to facilitate evaporation of the unwanted stearic acid from said material, the evaporated material being removed through said other opening.

* * * * *